US010309800B2

(12) United States Patent
Knuth et al.

(10) Patent No.: US 10,309,800 B2
(45) Date of Patent: Jun. 4, 2019

(54) INTELLIGENT RECEPTACLE (71) Applicant: Itron, Inc., Liberty Lake, WA (US)

(72) Inventors: John Jay Knuth, Spokane Valley, WA (US); Richard Nolan DeVries, Spokane Valley, WA (US); Stephen Johnson, Spokane, WA (US)

(73) Assignee: Itron, Inc., Liberty Lake, WA (US)

( * ) Notice: Subject to any disclaimer, the term of this patent is extended or adjusted under 35 U.S.C. 154(b) by 146 days.

(21) Appl. No.: 15/585,894

(22) Filed: May 3, 2017

(65) Prior Publication Data

US 2017/0234698 A1 Aug. 17, 2017

Related U.S. Application Data (63) Continuation of application No. 13/828,837, filed on Mar. 14, 2013, now Pat. No. 9,677,907.

(51) Int. Cl.
*G01D 4/00* (2006.01)
*H04Q 9/00* (2006.01)

(52) U.S. Cl.
CPC ............. *G01D 4/002* (2013.01); *H04Q 9/00* (2013.01); *H04Q 2209/60* (2013.01); *Y02B 90/241* (2013.01); *Y02B 90/244* (2013.01); *Y02B 90/246* (2013.01); *Y04S 20/32* (2013.01); *Y04S 20/327* (2013.01); *Y04S 20/42* (2013.01)

(58) Field of Classification Search
CPC .... G01D 4/002; Y02B 90/244; Y02B 90/241; Y02B 90/246; Y04S 20/327; Y04S 20/42; Y04S 20/32
See application file for complete search history.

(56) References Cited

U.S. PATENT DOCUMENTS

| 4,783,748 A | 11/1988 | Swarztrauber et al. |
| 5,539,304 A | 7/1996 | Payne et al. |
| 6,084,394 A * | 7/2000 | Windsheimer ......... G01R 35/04 324/130 |

(Continued)

FOREIGN PATENT DOCUMENTS

| EP | 1806590 A2 | 7/2007 |
| JP | 04358293 | 12/1992 |

(Continued)

OTHER PUBLICATIONS

The Summons to Attend Oral Proceedings dated May 3, 2017 for European patent application No. 13803314.7, a counterpart foreign application of U.S. Appl. No. 13/717,576, 4 pages.

(Continued)

*Primary Examiner* — Christopher E. Everett
(74) *Attorney, Agent, or Firm* — Lee & Hayes, P.C.

(57) ABSTRACT

An intelligent receptacle (or receptacle device) enables individually monitoring and/or controlling consumption of utility service by one or more loads through a supply outlet that is associated with the receptacle device. A client device may enable a user to remotely control a provision of the utility service from the supply outlet through the receptacle device. Furthermore, a utility metering device may include a virtual metering device instance that is configured to collect utility consumption data associated with the supply outlet from the receptacle device and help calibration or synchronization of utility consumption readings of the receptacle device.

20 Claims, 5 Drawing Sheets

(56) References Cited

U.S. PATENT DOCUMENTS

| | | | |
|---|---|---|---|
| 6,591,229 B1 | 7/2003 | Pattinson et al. | |
| 7,272,518 B2* | 9/2007 | Bickel | G01D 4/004 |
| | | | 702/61 |
| 8,433,530 B2 | 4/2013 | Shimada et al. | |
| 8,613,659 B2 | 12/2013 | Nelson et al. | |
| 2002/0120723 A1 | 8/2002 | Forth et al. | |
| 2003/0151415 A1* | 8/2003 | Randall | G01R 35/04 |
| | | | 324/601 |
| 2003/0158677 A1 | 8/2003 | Swarztrauber et al. | |
| 2004/0122833 A1 | 6/2004 | Forth et al. | |
| 2007/0103335 A1 | 5/2007 | Fitzgerald et al. | |
| 2008/0141266 A1 | 6/2008 | Hunt et al. | |
| 2008/0272934 A1 | 11/2008 | Wang et al. | |
| 2009/0276771 A1 | 11/2009 | Nickolov et al. | |
| 2010/0042372 A1 | 2/2010 | Carter et al. | |
| 2010/0070217 A1 | 3/2010 | Shimada et al. | |
| 2010/0117856 A1 | 5/2010 | Sonderegger | |
| 2011/0040785 A1 | 2/2011 | Steenberg et al. | |
| 2011/0063126 A1* | 3/2011 | Kennedy | G01D 4/002 |
| | | | 340/870.02 |
| 2011/0202196 A1* | 8/2011 | Venkatakrishnan | G06Q 50/06 |
| | | | 700/295 |
| 2011/0296169 A1 | 12/2011 | Palmer | |
| 2011/0313964 A1 | 12/2011 | Sanchey Loureda et al. | |
| 2011/0316717 A1 | 12/2011 | Young et al. | |
| 2012/0036250 A1 | 2/2012 | Vaswani et al. | |
| 2012/0246042 A1 | 9/2012 | Littrell | |
| 2012/0271475 A1 | 10/2012 | Wang et al. | |
| 2012/0330615 A1 | 12/2012 | Cornwall et al. | |
| 2013/0007203 A1 | 1/2013 | Szu | |
| 2013/0069617 A1 | 3/2013 | Lee | |
| 2014/0040343 A1 | 2/2014 | Nickolov et al. | |
| 2014/0167976 A1 | 6/2014 | Barrett et al. | |
| 2014/0167981 A1 | 6/2014 | Pontin et al. | |
| 2014/0277783 A1 | 9/2014 | Knuth et al. | |
| 2014/0337843 A1* | 11/2014 | Delamare | H04B 3/542 |
| | | | 718/1 |

FOREIGN PATENT DOCUMENTS

| | | |
|---|---|---|
| JP | 2000241194 | 9/2000 |
| JP | 2007082078 | 3/2007 |
| JP | 2009544012 | 12/2009 |
| JP | 2011027671 | 2/2011 |
| JP | 2012008894 | 1/2012 |
| JP | 2012043438 | 3/2012 |
| JP | 2012059221 | 3/2012 |
| WO | WO03036874 | 5/2003 |
| WO | WO2010019476 | 2/2010 |

OTHER PUBLICATIONS

The Japanese Office Action dated Jul. 4, 2017 for Japanese patent application No. 2015-547940, a counterpart foreign application of U.S. Appl. No. 13/717,576.

European Office Action dated Feb. 5, 2018 for European patent application No. 13803314.7, a counterpart foreign application of U.S. Pat. No. 9,747,786, 3 pages.

European Office Action dated Jun. 18, 2018 for European Patent Application No. 13803314.7, a counterpart foreign application of U.S. Pat. No. 9,747,786, 5 pages.

U.S. Appl. No. 13/717,406, filed Dec. 17, 2012, Gregory Shane Barrett et al., "Virtual Metering With Partitioned Metrology," 52 pages.

U.S. Appl. No. 13/717,576, filed Dec. 17, 2012, Joseph Pontin et al., "Virtual Cluster Meter (VCM) ," 51 pages.

The Australian Office Action dated Mar. 18, 2016 for Australian Patent Application No. 2013364184, a counterpart foreign application of U.S. Pat. No. 9,082,291, 3 pages.

The European Office Action dated Jul. 6, 2016 for European patent application No. 13803314.7, a counterpart foreign application of U.S. Appl. No. 13/717,576, 4 pages.

The Japanese Office Action dated Dec. 13, 2016 for Japanese Patent Application No. 2015-547940, a counterpart foreign application of U.S. Appl. No. 13/717,576, 7 pgs.

The Japanese Office Action dated Jul. 5, 2016 for Japanese patent application No. 2015-547938, a counterpart foreign application of U.S. Pat. No. 9,082,291, 4 pgs.

The Japanese Office Action dated Aug. 23, 2016 for Japanese patent application No. 2015-547940, a counterpart foreign application of U.S. Appl. No. 13/717,576, 11 pgs.

Office action for U.S. Appl. No. 13/717,576, dated Nov. 5, 2015, Pontin et al., "Virtual Cluster Meter (VCM)", 13 pages.

Office Action for U.S. Appl. No. 13/717,406, dated Nov. 6, 2014, Gregory Shane Barrett, "Virtual Metering With Partitioned Metrology", 11 pages.

Office Action for U.S. Appl. No. 13/717,576, dated Dec. 12, 2016, Pontin et al., "Virtual Cluster Meter (VCM)", 17 pages.

Office action for U.S. Appl. No. 13/828,837, dated Dec. 2, 2016, Knuth et al., "Intelligent Receptacle", 33 pages.

Office Action for U.S. Appl. No. 13/717,576, dated Dec. 26, 2014, Joseph Pontin, "Virtual Cluster Meter (VCM)", 19 pages.

Office action for U.S. Appl. No. 13/828,837, dated Mar. 14, 2016, Knuth et al., "Intelligent Receptacle", 19 pages.

Office Action for U.S. Appl. No. 13/717,576, dated Apr. 19, 2016, Pontin et al., "Virtual Cluster Meter (VCM)", 20 pages.

Final Office Action for U.S. Appl. No. 13/717,576, dated Jun. 9, 2015, Joseph Pontin, "Virtual Cluster Meter (VCM)", 27 pages.

Office action for U.S. Appl. No. 13/828,837, dated Jul. 8, 2015, Knuth et al., "Intelligent Receptacle", 14 pages.

Office action for U.S. Appl. No. 13/828,837, dated Aug. 12, 2016, Knuth et al., "Intelligent Receptacle", 28 pages.

PCT Search Report and Written Opinion dated Feb. 13, 2014 for PCT Application # PCT/US13/68230, 10 pgs.

PCT Search Report and Written Opinion dated Jun. 25, 2014 for PCT Application No. PCT/US13/68223, 14 Pages.

* cited by examiner

FIG. 4

INTELLIGENT RECEPTACLE

CROSS REFERENCE TO RELATED APPLICATIONS

This is a continuation application which claims priority to commonly assigned, co-pending U.S. patent application Ser. No. 13/828,837, filed Mar. 14, 2013. Application Ser. No. 13/828,837 is fully incorporated herein by reference.

BACKGROUND

Consumption or usage information of a utility service (such as electricity, etc.) is valuable not only to utility service providers but also utility service consumers. Utility service providers have utility metering systems that collect utility consumption information for residential and commercial loads and can use this utility consumption information to determine or estimate an amount of utility service that has been consumed over an interval or real-time basis. In contrast, utility service consumers may receive utility consumption information only on a monthly basis, and typically well after the utility consumption actually occurred. Such infrequent feedback from the utility service does not provide adequate information to consumers to modify their behavior (e.g., to conserve electricity) in response to costs.

Furthermore, the utility service consumers have no knowledge of how much of a utility service (e.g., electricity) is consumed by each individual appliance or device on a circuit over a certain period of time, and are therefore unable to individually monitor utility service consumption and/or performance of devices.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

As noted above, a utility service consumer is unable to determine or monitor how much utility service (e.g., electricity) is consumed by an individual appliance or device during a certain period of time. This disclosure describes an intelligent receptacle or receptacle device that enables a utility service consumer to individually monitor and/or control a utility service consumed by and/or supplied to each load. As used herein, the term "load" refers to an appliance or device (or group of appliances or devices, such as all appliances or devices plugged into a multi-outlet extension cord or power strip) that consumes a utility service (such as an electricity service, a water service, a gas service, etc.).

In one implementation, the receptacle device may be integrated with a utility service supply outlet or a supply outlet (such as a wall power socket, an extension cord or power strip having one or more power outlets, or a charging station for electricity service, for example) from which a load (e.g., an electric appliance, etc.) obtains the utility service. In some implementations, the receptacle device may be a peripheral device or an adapter through which the supply outlet delivers the utility service to the load. In one implementation, the receptacle device may include a device plugged into a supply outlet or hardwired into a circuit (such as an electrical circuit or breaker for electricity service, etc.) at a site which may include a real property (including, for example, a residential or commercial property, a room, an apartment, a house, an office, a multi-unit building, etc.), etc.

In one implementation, the load may be a utility-consuming appliance or device (e.g., an electric vehicle, a water heater, a gas furnace, an air conditioning system, a water tap system, etc.). Additionally or alternatively, the load may be associated with a site. Depending on a type of load that the receptacle device is used for, the receptacle device may be in a different form as described in the foregoing implementations.

In some implementations, the receptacle device may include a metrology sensor. The metrology may be configured to measure an amount of the utility service that has been consumed by or delivered to the load from the supply outlet. The receptacle device may further include memory that stores historical data or information of the utility service that is delivered through the supply outlet or consumed by the load. In one implementation, if the supply outlet includes more than one output, the receptacle device may include more than one metrology sensor, with a separate metrology sensor for each output to measure an amount of the utility service that is delivered from a respective output of the supply outlet.

Additionally or alternatively, the receptacle device may include a communication interface that is configured to communicate data with one or more other devices over a network connection. The one or more other devices may include, for example, a utility metering device of an associated utility service provider, a home area network device, a client device of a user associated with the load, etc. The receptacle device may communicate data of utility service delivery or consumption through the supply outlet to the one or more other devices and may receive an instruction from the one or more other devices for monitoring and/or controlling delivery or consumption of the utility service through the supply outlet. For example, the receptacle device may communicate utility service delivery or consumption information with other receptacle devices. In one implementation, the receptacle device and the other receptacle devices may cooperatively monitor and/or control utility service delivery from respective supply outlets and/or utility service consumption of respective loads. For example, the receptacle device and the other receptacle devices may cooperatively monitor and/or control utility service delivery from respective supply outlets and/or utility service consumption of respective loads so that a total amount of utility service delivery or consumption is maintained to be under a target peak level. Additionally or alternatively, the receptacle device may disable or enable utility service delivery from the supply outlet to the load based on the utility service delivery or consumption information received from the other receptacle devices.

In one implementation, the network connection may include a wireless connection (such as a WiFi, ZigBee, etc.) and/or a wired connection. When used, the wired connection may comprise a current carrying conductor used to deliver electricity service to all or a portion of the site, and communication may be by power line communication (PLC) over the current carrying conductor. Other wired communication connections (e.g., Ethernet, serial connection, etc.) may additionally or alternatively be used.

In some implementations, the receptacle device may further include a timer or scheduler used to control a switch of the receptacle. The timer is configured to measure a time duration when the consuming device consumes the utility service. Additionally or alternatively, the timer may enable the user or the utility service provider to set, schedule or restrict a time period in which the supply outlet is allowed to deliver the utility service to a consuming device connected thereto and, using the switch, to start or stop the delivery of the utility service at a scheduled time.

In one implementation, the receptacle device may include a user interface that displays information associated with the utility service to the user of the load. For example, the user interface may display a total amount of utility service delivered through the supply outlet or consumed by the consuming device within a certain period of time. Additionally or alternatively, the user interface may enable the user to input information which may be used as an instruction to the receptacle device for monitoring and/or controlling the delivery of the utility service through the supply outlet. For example, the user may input information of a start time and an end time (or a time duration) to the receptacle device through the user interface. The receptacle device may then recognize this information as a time period desired by the user to deliver the utility service to the consuming device through the supply outlet.

The described receptacle device individually monitors and controls delivery of a utility service from a supply outlet and/or consumption of the utility service by a consuming device, thereby enabling a user or a utility service provider to manipulate delivery and/or consumption of the utility service for supply outlets and/or consuming devices on an individual basis. This facilitates the user or the utility service provider to monitor and/or control the delivery or consumption of the utility service from the supply outlet or to the consuming device without worrying about other supply outlets or consuming devices.

The application describes multiple and varied embodiments and implementations. The following section describes an example environment that is suitable for practicing various implementations. Next, the application describes example systems, devices, and processes for implementing an intelligent receptacle.

Example Environment

Figure 1A:
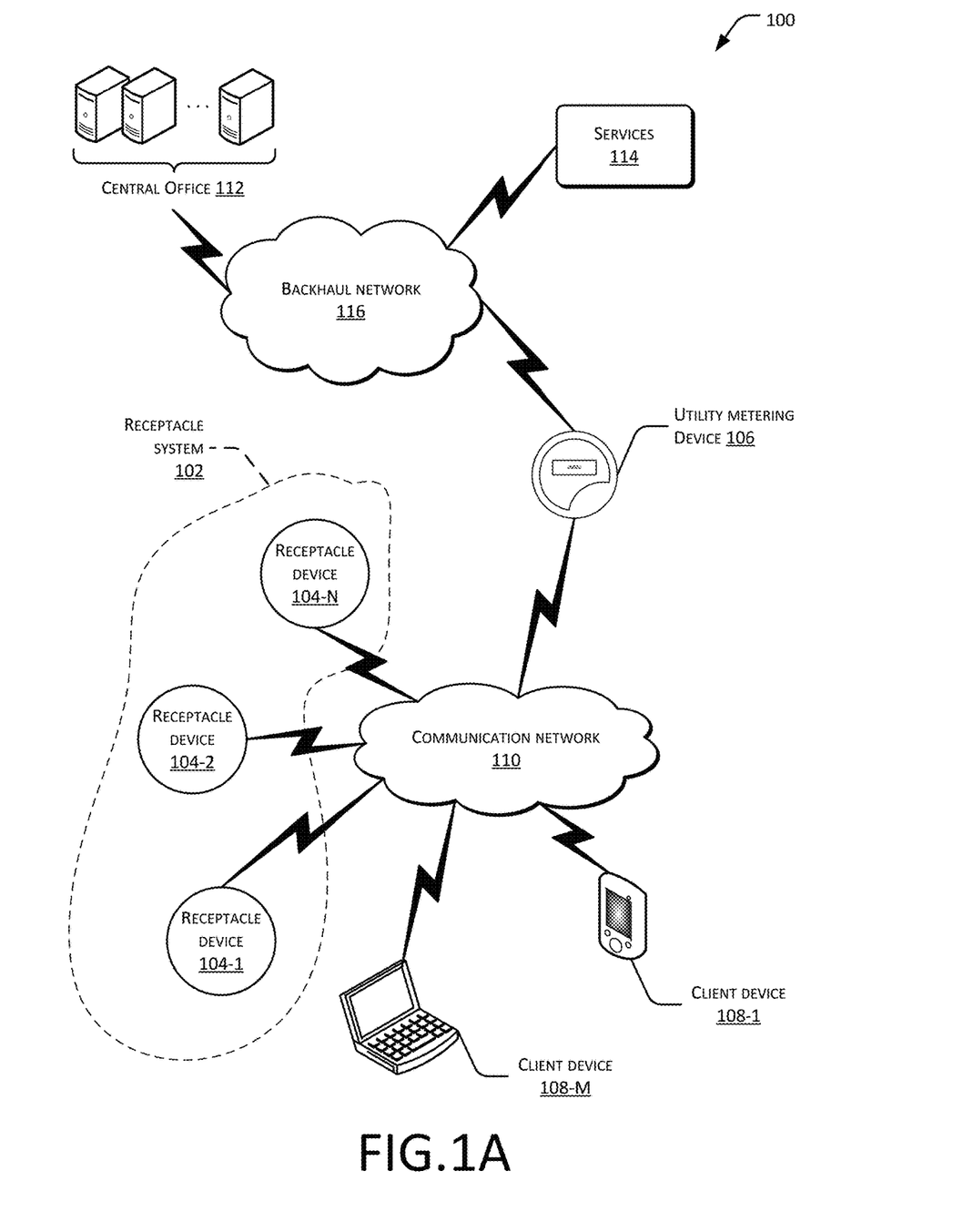
FIG. 1A illustrates an example environment usable to implement an example receptacle system usable to collect consumption information for individual consuming device. In this example, the receptacle system includes one or more receptacle devices, which may be in communication with one another.

FIG. 1A is a schematic diagram of an example environment 100 usable to implement a receptacle system 102. In this example, the receptacle system 102 may include a plurality of receptacle devices 104-1, 104-2, . . . , 104-N (collectively referred to as a receptacle device 104). In one instance, the environment 100 may include a utility metering device 106 and one or more client devices 108-1, . . . 108-M (collectively referred to as a client device 108). Each of N and M represents an integer that is greater than or equal to one. Although in this example, the receptacle system 102 is described to include only the receptacle devices 104, in some implementations, the receptacle system 102 may include the utility metering device 106 and/or one or more client devices 108.

In one implementation, the plurality of receptacle devices 104, the utility metering device 106 and the one or more client devices 108 may communicate data with one another through a communication network 110.

In one implementation, the utility metering device 106 may be implemented as a smart utility meter (e.g., electric, gas, and/or water meter).

In some implementations, the client device 108 may be implemented as any of a variety of conventional computing devices. Examples of these conventional computing devices include a notebook or portable computer, a handheld device, a netbook, an Internet appliance, a portable reading device, an electronic book reader device, a tablet or slate computer, a game console, a mobile device (e.g., a mobile phone, a personal digital assistant, a smart phone, etc.), a media player, etc., or a combination thereof.

In one implementation, the communication network 110 may include a wireless network, a wired network or a combination thereof. The communication network 110 may be a collection of individual networks interconnected with each other. Examples of such individual networks include, but are not limited to, Local Area Networks (LANs), Home Area Network (HAN), etc. Further, the individual networks may be wireless or wired networks, or a combination thereof. In some implantations, the communication network 110 may include one or more types of communication channels, such as a power line communication (PLC) channel, a radio frequency (RF) channel (such as a WiFi connection, a ZigBee connection, etc.), a physical cable channel (such as a physical cable connection), etc.

In some implementations, the environment 100 may further include a central office 112. The central office 112 may include a centralized meter data management system to perform processing, analysis, storage, and/or management of data received from the utility metering device 106. For instance, the central office 112 may process, analyze, store, and/or manage data obtained from a smart utility meter, sensor, control device, router, regulator, server, relay, switch, valve, and/or other devices. Additionally or alternatively, the central office 112 may include a network management system (NMS) for maintaining a registry of devices of the AMI network, device configuration settings, version information, and the like. Although the example of FIG. 1A illustrates the central office 112 in a single location, the central office 112 may be distributed amongst multiple locations or may be eliminated entirely (e.g., in the case of a highly decentralized distributed computing platform).

In one implementation, the environment 100 may further include one or more services 114. The one or more services 114 may include one or more servers, one or more networking devices and/or one or more computing devices, etc. In some implementations, the one or more services 114 may provide functions that support the central office 112. Additionally or alternatively, the one or more services 114 may receive data (such as utility consumption data) from the utility metering device 106 and/or the central office 112 and provide functions (e.g., data storage, data analysis, etc.) that support the utility metering device 106 and/or the central office 112.

In one implementation, the utility metering device 106 may communicate data with the central office 112 and/or the one or more services 114 through a backhaul network 116. The backhaul network 116 may include a wireless network, a wired network or a combination thereof. The backhaul network 116 may be a collection of individual networks interconnected with each other and functioning as a single large network (e.g., the Internet or an intranet). Examples of such individual networks include, but are not limited to, telephone networks, cable networks, Local Area Networks (LANs), Wide Area Networks (WANs), and Metropolitan Area Networks (MANs). Further, the individual networks may be wireless or wired networks, or a combination thereof.

Figure 1B:
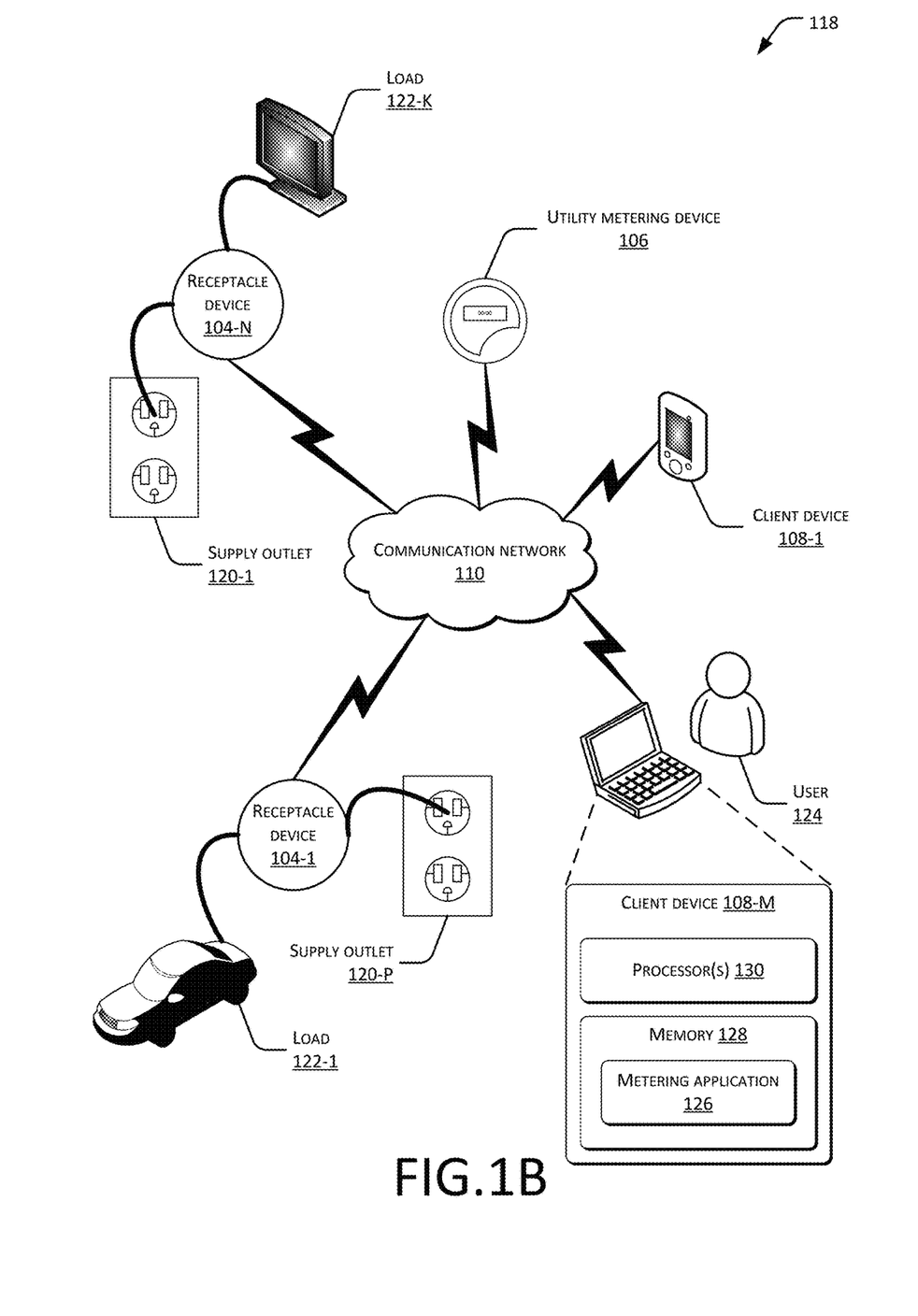
FIG. 1B illustrates details of another example receptacle system for collecting consumption information of an electricity service. In this example, the receptacle system may include one or more receptacle devices, which may be in communication with one another, a utility metering device, one or more client devices, and/or a communication network.

FIG. 1B shows an example application 118 of the receptacle system 102 of FIG. 1A. In this example application 118, the receptacle device 104 is described to be used for electricity service, and the receptacle system 102 is described to include one or more receptacle devices 104, which may be in communication with one another, a utility metering device 106, one or more client devices 108, and/or a communication network 110.

In one implementation, the example application 118 may include one or more supply outlets 120-1, . . . , 120-P (collectively referred to as supply outlets 120). Additionally, the application may further include one or more loads 122-1, . . . , 122-K (collectively referred to as loads 122). P and K are integers that are greater than or equal to one. Although in this example application, the receptacle system 102 is described to be used for electricity service, the receptacle system 102 (or the receptacle device 104) may be used for other utility services such as water service, gas service, etc.

In one implementation, the load 122 may be a utility-consuming appliance or device (e.g., a water heater, a gas furnace, an air conditioning system, a water tap system, etc.). Additionally or alternatively, the load 122 may be associated with a site such as a real property (e.g., a residential or commercial property, a room, an apartment, a house, an office, a multi-unit building, etc.), etc.

In one implementation, the receptacle device 104 may be integrated with a supply outlet 120 (such as a wall power socket for electricity service or a gas pipe leading to a gas-consuming device for gas service, for example) from which a load 122 (e.g., an electric appliance or a gas furnace, etc.) obtains the utility service. In some implementations, the receptacle device 104 may be a peripheral device or an adapter through which a supply outlet 120 delivers the utility service to the load 122. In one implementation, the receptacle device 104 may include a device plugged into the supply outlet 120 or hardwired into a circuit (such as an electrical circuit or breaker for electricity service, etc.) at a site. In one implementation, depending on a type of load 122 that the receptacle device 104 is used for, the receptacle device 104 may be in a different form as described in the foregoing implementations. The utility service may include, for example, an electricity service, a water service, a gas service, etc.

In one implementation, a user 124 may use a client device 108 to monitor and/or control delivery of the utility service from a supply outlet 120 through a receptacle device 104 associated with the supply outlet 120. For example, the client device 108 may include a metering application 126 stored in a memory 128 and executable by one or more processors 130 of the client device 108. The metering application 126 may enable the user 124 to communicate data with a receptacle device 104 and/or a utility metering device 106. The metering application 126 may further enable the user 124 to monitor and/or control a supply of the utility service from an associated supply outlet 120 to an associated load 122 with which the receptacle device 104 is associated. Examples of monitoring and/or controlling include, for example, starting, stopping and/or restricting a delivery of the utility service through the supply outlet 120 to an associated load 122 within a specific period of time.

Example Receptacle Device

Figure 2:
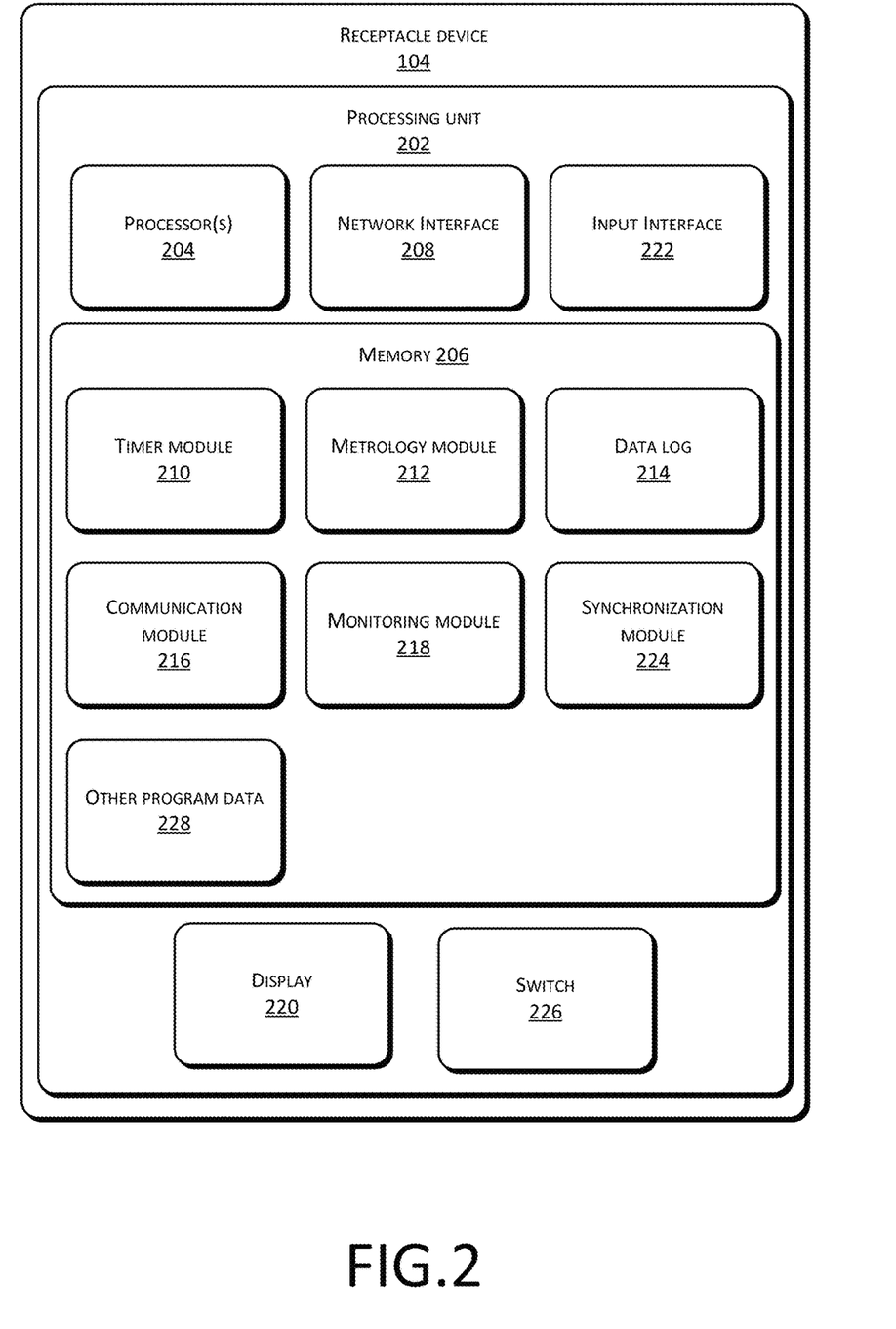
FIG. 2 illustrates an example receptacle device usable in the environment of FIG. 1A.

FIG. 2 illustrates the example receptacle device 104 in more detail. For the sake of description, electricity service is used hereinafter as an example of the utility service to be delivered and consumed. This disclosure, however, is not limited to the electricity service, but includes other utility services such as a water service and a gas service. Specifically, the receptacle device 104 may be adapted accordingly for a given utility service. For example, if the utility service is a gas service, the receptacle device 104 may be a peripheral device (e.g., a peripheral device having a gas gauge or a flow meter, a valve, etc.) that is installed and positioned prior to a gas input of a gas-consuming device (such as a gas furnace, for example).

In one implementation, the receptacle device 104 includes, but is not limited to a processing unit 202. The processing unit 202 may include one or more processor(s) 204 communicatively coupled to memory 206. The memory 206 may be configured to store one or more program, software and/or firmware modules, which are executable by the processor(s) 204 to implement various functions. While the modules are described herein as being software and/or firmware stored in memory and executable by a processor, in other implementations, any or all of the modules may be implemented in whole or in part by hardware (e.g., as an ASIC, FPGA, a specialized processing unit, etc.) to execute the described functions.

The memory 206 may include processor-readable media and may take the form of volatile memory, such as random access memory (RAM) and/or non-volatile memory, such as read only memory (ROM) or flash RAM. Processor-readable media includes volatile and non-volatile, removable and non-removable media implemented in any method or technology for storage of information such as processor-readable instructions, data structures, program modules, or other data for execution by one or more processors of a computing device. Examples of processor-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, processor-readable media does not include modulated data signals and carrier waves.

In one implementation, the receptacle device 104 may further include a network interface 208 that is configured to communicate data with other devices (e.g., the utility metering device 106 or the client device 108) through the communication network 110 or the backhaul network 116.

Additionally or alternatively, the receptacle device 104 or the processing unit 202 may include a timer module 210 configured to maintain a time and/or a time schedule. For example, the timer module 210 may be used as a count-up or count-down timer, a clock, etc.

In some implementations, the receptacle device 104 may include a metrology module 212 that is configured to collect delivery data of the utility service associated with the supply outlet 120 and/or consumption data of the utility service associated with the load 122. For example, the supply outlet 120 may be a wall power socket for electricity service and may include two power outputs. The metrology module 212 of the receptacle device 104 that is associated with this supply outlet 120 may measure power delivery individually from each power output of the supply outlet 120 (i.e., power consumption of an associated load 122 through that power output of the supply outlet 120) and/or a total power delivery from the supply outlet 120. In one implementation, the metrology module 212 may include a metrology meter that measures an amount of the utility service delivered to or consumed by the load 122. In some implementations, the metrology module 212 may further estimate a cost of the utility service consumed by the load 122 or delivered by the supply outlet 120 based on a predefined utility fee rate given by the utility service provider, for example.

In one implementation, the receptacle device 104 may further include a data log 214. The data log 214 stores historical delivery or consumption of the utility service of the supply outlet 120 or the load 122 respectively that has been determined by the metrology module 212. In some implementations, the receptacle device 104 or the timer module 210 may further timestamp each delivery or consumption of the utility service associated with the supply outlet 120 or the load 122 and the data log 214 may store an associated timestamp with each delivery or consumption of the utility service. For example, the receptacle device 104 may record a start time, an end time and/or a time duration associated with each delivery or consumption of the utility service. The receptacle device 104 may store this start time, end time and/or time duration in association with a respective amount of the utility service that is delivered through the supply outlet 120 or consumed by the load 122 in the data log 214.

Additionally or alternatively, the receptacle device 104 may include a communication module 216. The communication module 216 may communicate data with one or more other devices (such as one or more receptacle devices 104 and/or utility metering devices 106) through the communication network 110. Additionally or alternatively, the communication module 216 may communicate data with the one or more client devices 108 through the backhaul network 116. Data to be communicated may include, but is not limited to, past and/or current utility delivery information through the supply outlet 120, instructions to control starting, stopping or limiting a delivery of the utility service through one or more outputs of the supply outlet 120, etc. Additionally, in some implementations, the receptacle device 104 or the communication module 216 may further include identification information of the receptacle device 104 in the data to be communicated in order to allow the other devices to recognize from which receptacle device 104 the data is received.

In one implementation, the receptacle device 104 may further include a monitoring module 218. The monitoring module 218 may individually monitor and control consumption of utility service by one or more loads 122 through the supply outlet 120 (or through one or more outputs of the supply outlet 120) that is associated with the receptacle device 104. For example, the monitoring module 218 may individually monitor and/or record consumption of the utility service associated with a load 122 and/or delivery of the utility service associated with (an output of) the supply outlet 120 over a period of time. In an event that the supply outlet 120 includes a plurality of outputs and the one or more loads 122 include a plurality of loads 122, the monitoring module 218 may individually monitor and/or control a load 122 of the plurality of loads 122 without affecting another load 122 of the plurality of loads 122.

In one implementation, the monitoring module 218 may include one or more rules and/or instructions that are set or received from the user 124 or the associated utility service provider. The one or more rules and/or instructions may include, but are not limited to, one or more normal operation periods and one or more time of uses (TOUs) set by the user or the utility service provider for the supply outlet 120, etc. Additionally or alternatively, the one or more rules and/or instructions may include, for example, a maximum amount of the utility service to be delivered within a predefined time period (such as a day, a week, a month, etc.), a maximum magnitude of the utility service (e.g., maximum current for electricity service, etc.) allowed to pass through the supply outlet 120 at any time, etc.

In some instances, the monitoring module 218 may work with the metrology module 212 to perform one or more monitoring tasks. For example, the monitoring module 218 may receive utility consumption or delivery information from the metrology module 212 continuously or periodically. Additionally or alternatively, the monitoring module 218 may receive the utility consumption or delivery information from the metrology module 212 in real time, i.e., receiving current or up-to-date information of the utility consumption or delivery in real time. The monitoring module 212 may examine the utility consumption or delivery information to determine whether the one or more rules and/or instructions are conformed or violated, and perform an action in accordance with the rule or instruction that is conformed or violated. Additionally or alternatively, the monitoring module 218 may work with the timer module 210 to monitor provision of the utility service from the supply outlet 120 to the load 122 according to a time schedule set up by the user 124 or the utility service provider.

In one implementation, the monitoring module 218 may further communicate with other devices (other receptacle devices 104, the utility metering device 106 and/or the client device 108), and exchange (send and receive) scheduling information and/or historical utility delivery information with the other devices. Upon exchanging scheduling and/or historical utility delivery information with the other devices, the monitoring module 218 may predict or propose one or more time schedules for delivering the utility service to one or more loads 122 from the supply outlet 120 that may lower a total utility delivery across a plurality of supply outlets 120 or a total utility consumption across a plurality of loads 122, i.e., load balancing. The monitoring module 218 may send this information to the client device 108 for display to the user 124 and allow the user 124 to select one or more proposed time schedules for delivering the utility service to the one or more loads 122 associated with the receptacle device 104. In one implementation, upon receiving an instruction (e.g., a user acceptance of one or more proposed time schedules) from the client device 108, the monitoring module 218 may set up times of utility delivery according to the accepted time schedules, and actuate a delivery of the utility service from the supply outlet 120 to the one or more loads 122 at the scheduled times.

In some instances, the receptacle device 104 (e.g., a receptacle device that is a peripheral device or adapter with respect to a supply outlet, etc.) may include a display 220 that enables the user 124 to view utility delivery or consumption information associated with the supply outlet 120 or the load 122 respectively. Examples of utility delivery or consumption information to be viewed may include, but are not limited to, a total or current amount of the utility service consumed by the load 122, a time of operation (such as a start time, an end time and/or a time duration that the load 122 consumes the utility service or the supply outlet 120 delivers the utility service, etc.), an estimated cost of the utility service that is consumed by the load since the start time of operation, etc. Additionally or alternatively, the display 220 or an input interface 222 (such as a button, a dial, a switch, an input pad, etc.) may enable the user 124 to input information such as a time or actuate an instruction (selected from a plurality of predefined instruction) to the receptacle device 104.

Additionally, in some implementations, the receptacle device 104 may further include a synchronization module 224 that is configured to synchronize utility consumption or delivery information with the utility metering device 106. The synchronization module 224 may update or correct a meter reading if a difference between the meter reading and a meter reading sent and determined by the utility metering device 106 is greater than or equal to a predetermined threshold of error. For example, the synchronization module 224 may send utility consumption data to the utility metering device 106 which may determine whether there is an error between the utility consumption data and utility consumption data measured or determined by the utility metering device 106. In one instance, the synchronization module 224 may receive a synchronization signal or message that may include correct utility consumption data determined by the utility metering device 106. The synchronization module 224 may then update or correct a current meter reading or utility consumption data of the metrology module 212 to reflect the correct utility consumption data determined by the utility metering device 106.

In one implementation, the receptacle device 104 may further include a switch 226 configured to turn on or off a flow or supply of the utility service through the supply outlet 120 or to the load 106. For example, the receptacle device 104 may receive an instruction from the client device 108 of the user 124 or the utility metering device 106 of the utility service provider to disconnect a supply of the utility service from the supply outlet 120 to the load 122. Additionally or alternatively, the receptacle device 104 may receive an instruction internally from the monitoring module 218 to switch on or off a supply of the utility service from the supply outlet 120 at times according to a time schedule set up by the user 124 or the utility service provider.

In some implementations, the receptacle device 104 may include other program data 228 that is configured to store information such as one or more instructions received from the utility metering device 106 and/or the client device 108, etc.

In some implementations, the receptacle device 104 may communicate utility service delivery or consumption information with other receptacle devices 104. In one implementation, the receptacle device 104 and the other receptacle devices 104 may cooperatively monitor and/or control utility service delivery from respective supply outlets 120 and/or utility service consumption of respective loads 122. For example, the receptacle device 104 and the other receptacle devices 104 may cooperatively monitor and/or control utility service delivery from respective supply outlets 120 and/or utility service consumption of respective loads 122 so that a total amount of utility service delivery or consumption is maintained to be under a target peak level. Additionally or alternatively, the receptacle device 104 may disable or enable utility service delivery from the supply outlet 120 to the load 122 through the switch 226 based on the utility service delivery or consumption information received from the other receptacle devices 104.

The receptacle device 104 enables the user 124 and/or the utility service provider to locally or remotely monitor and/or control a flow of utility service from an associated supply outlet 120 to a load 122 independent from other receptacle devices 104, supply outlets 120 and/or loads 122.

Example Utility Metering Device

Figure 3:
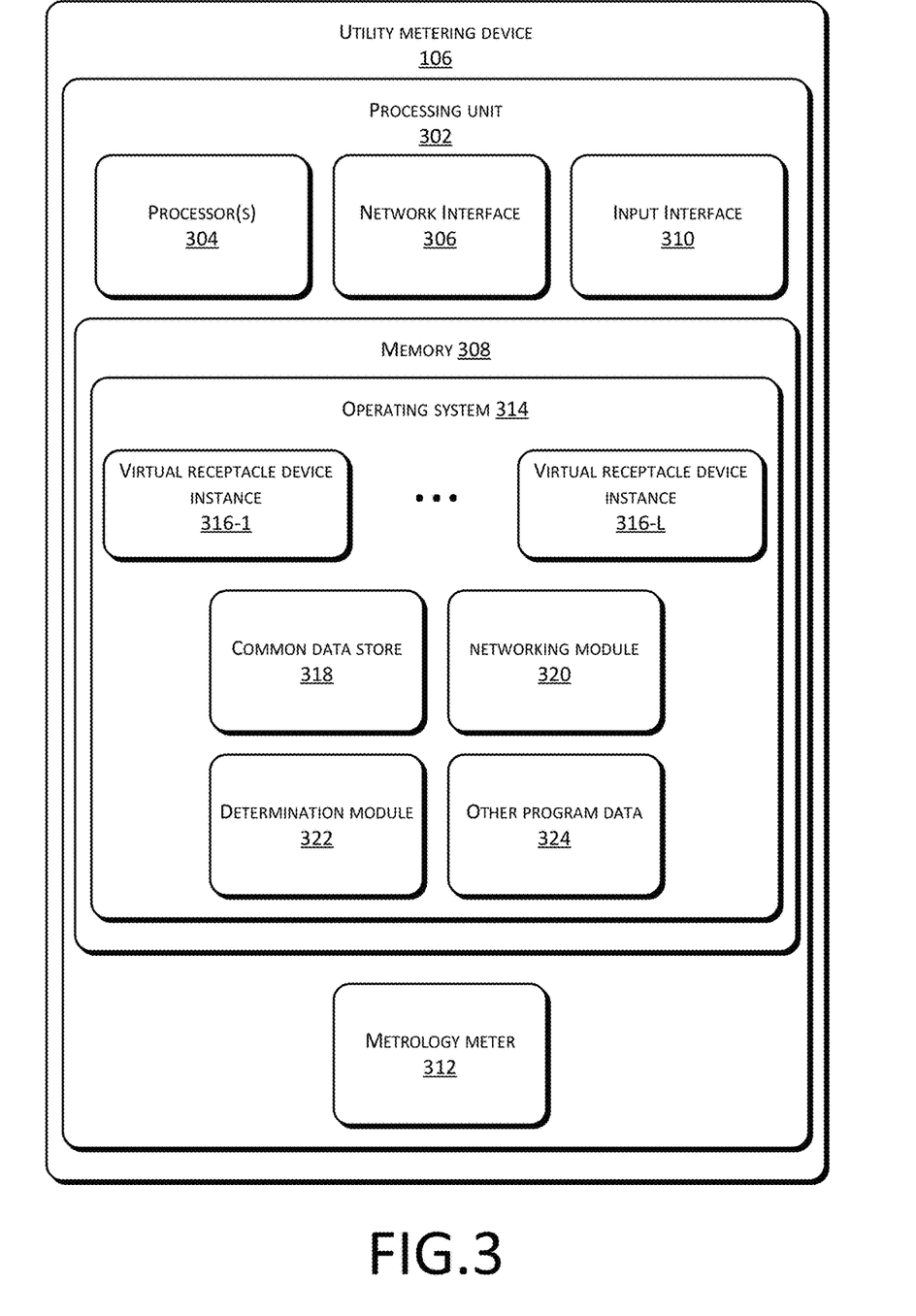
FIG. 3 illustrates an example utility metering device usable in the environment of FIG. 1A.

FIG. 3 illustrates the utility metering device 106 in more detail. In one implementation, the utility metering device 106 may include, but is not limited to, a processing unit 302. The processing unit 302 may include one or more processors 304, a network interface 306 and memory 308. In some implementations, the utility metering device 106 may optionally include an input/output interface 310. The processor(s) 304 is configured to execute instructions received from the network interface 306, the input/output interface 310, and/or stored in the memory 308. The memory 308 may include processor-readable media.

In some implementations, the utility metering device 106 may include a metrology meter 312 configured to measure an amount of the utility service delivered through some or all of the plurality of supply outlets 120 and/or consumed by some or all of the plurality of loads 122 respectively. For example, the metrology meter 312 may be positioned in a location through which the utility service (e.g., electricity service) delivered to some or all of the plurality of supply outlets 120 is transmitted and therefore may measure a total amount of the utility service delivered through these supply outlets 120 continuously or periodically. In some implementations, instead of including the metrology meter 312, the metrology meter 312 may be a separate entity from the utility metering device 106, and is remotely or locally connected or attached to the utility metering device 106 through a network, such as the communication network 110, to provide the utility delivery or consumption information to the utility metering device 106.

In one implementation, the utility metering device 106 may include an operating system 314. The operating system 314 may include, for example, a multi-tasking operating system such as, for example, Linux®, Unix®, Windows CE®, etc. Additionally, the utility metering device 106 may include one or more instances of one or more virtual receptacle devices 316-1, . . . , 316-L (collectively referred to as a virtual receptacle device instance 316) running in the operating system 314, where L is an integer greater than or equal to one. In other instances, a virtual receptacle device instance 316 may include its own instance of an operating system (e.g., the operating system 314) and its associated drivers. Each virtual receptacle device instance 316 may be associated with at most one receptacle device 104 connected to the utility metering device 106. Additionally or alternatively, one or more virtual receptacle device instances 316 may be associated with a single receptacle device 104. In one implementation, each virtual receptacle device instance 316 may perform different operations on metrology data (e.g., utility consumption or delivery information or data) received from a corresponding receptacle device 104. Examples of different operations on the metrology data may include, for example, processing of the metrology data for a billing purpose, processing of the metrology data for determining characteristics of the metrology data (e.g., utility delivery or consumption information associated with the supply outlet 120 or the load 122 respectively with which the receptacle device 104 is associated), monitoring quality of the utility service delivered through the supply outlet 120 or to the load 122, etc.

In one implementation, the virtual receptacle device instance 316 may communicate data (such as control signal, metrology data, etc.) with the corresponding receptacle device 104 through the communication network 110. The network interface 306 supports a separate or independent communication between a receptacle device 104 and a virtual receptacle device instance 316. For example, upon receiving metrology data from a receptacle device 104, the network interface 306 may route the metrology data to a virtual receptacle device instance 316 to which this receptacle device 104 corresponds for subsequent processing. The network interface 306 may determine which virtual receptacle device instance 316 corresponds to which receptacle device 104 based on, for example, identification information of the receptacle device 104 and/or identification information of the virtual receptacle device instance 316.

In one implementation, the virtual receptacle device instance 316 may communicate data with the corresponding receptacle device 104 using a secure encryption protocol or algorithm. Examples of the secure encryption protocol or algorithm may include, for example, a shared key encryption, a public/private key encryption, a digital signature, a message authentication code (MAC), etc. Depending on the processing and encryption capabilities of the receptacle device 104, one or more encryption protocols or algorithms may be selected for data communication. For instance, in some implementations, the virtual receptacle device instance 316 may send a control signal or instruction to an associated receptacle device 104 to actuate a disconnection of a supply of the utility service from a supply outlet 120 (with which the receptacle device 104 is associated) using a secure encryption protocol, for example, a digital signature.

Additionally, the utility metering device 106 may further include a common data store 318 that are shared and/or accessible by one or more virtual receptacle device instances 316. The data store 318 may store common data or information that is usable by the virtual receptacle device instances 316.

Additionally, the utility metering device 106 may include a networking module 320 that transmits the metrology data received from the one or more receptacle devices 104 to the utility service provider (e.g., the services 114 or the central office 112) after processing by respective virtual receptacle device instances 316. In one implementation, prior to sending the processed metrology data, the networking module 320 may segregate the processed metrology data according to the receptacle devices 104, the virtual receptacle device instances 316, and separately send the segregated metrology data to the utility service provider. Alternatively, the networking module 320 may send the processed metrology data of the receptacle devices 104 to the utility service provider without segregation.

In some implementations, the networking module 320 may receive a control signal or instruction from the utility service provider to remotely disconnect the utility service from serving the load 122 with which the receptacle device 104 is associated. In response to receiving the control signal or instruction, the utility metering device 106 may send the control signal to the receptacle device 104 (or the switch 226) to remotely disconnect the utility service from serving the load 122.

In one implementation, the utility metering device 106 may include a determination module 322 configured to determine accuracy of utility consumption data received from a receptacle device 104. For example, the determination module 322 may compute one or more total utility consumption values based on the metrology data (for example, utility consumption values) received by the virtual receptacle device instances 316 for respective receptacle devices 104 at one or more time points or time periods. The determination module 322 may compare the one or more total utility consumption values with utility consumption values measured by the metrology meter 312 at respective one or more time points or time periods. If a difference between a computed total utility consumption value and a measured utility consumption value is less than a predefined threshold of error, the determination module 322 may determine that measurements of the receptacle devices 104 are correct or calibrated.

Alternatively, in an event that a difference between a computed total utility consumption value and a measured utility consumption value is greater than or equal to the predefined threshold of error, the determination module 322 may determine that the measurements of one or more of the receptacle devices 104 are in error. In response to determining that the measurements of one or more of the receptacle devices 104 are in error, the determination module 322 may examine the utility consumption values received from the receptacle devices 104 to determine which receptacle device(s) is/are in error. For example, the determination module 322 may correlate the utility consumption values received from the receptacle devices 104 with the utility consumption values measured by the metrology meter 312 over one or more periods of time, and obtain respective degrees of correlation for the receptacle devices 104. The determination module 322 may then determine that a receptacle device 104 is in error or out of calibration if its degree of correlation is less than or equal to a predetermined threshold of correlation.

Upon determining which one or more receptacle devices 104 are in error, the determination module 322 may send a synchronization signal to the one or more receptacle devices 104 that are in error and calibrate the one or more receptacle devices 104 in accordance with the utility metering device 106. For example, the utility metering device 106 or one or more associated virtual receptacle device instances 316 may send data including one or more correct utility consumption readings to respective one or more receptacle devices 104 to calibrate one or more utility consumption readings of the respective receptacle devices 104.

In some implementations, the determination module 322 may further compare and/or correlate the utility consumption values received from the receptacle devices 104 with the utility consumption values measured by the metrology meter 312 (e.g., over one or more periods of time) to determine whether a leakage of the utility service exists. For example, upon comparing and/or correlating the utility consumption values received from the receptacle devices 104 with the utility consumption values measured by the metrology meter 312 over one or more time periods, the determination module 322 may determine that a degree of correlation associated with each receptacle device 104 is within a threshold of error, i.e., greater than or equal to a predetermined threshold of correlation. However, the determination module 322 may also find that there exists utility consumption value(s) measured by the metrology meter 312 that is unaccountable by the utility consumption values received from the receptacle devices 104 over the one or more periods of time. The determination module 322 may then determine or conclude that a leakage of the utility service may exist and report this leakage information to the client device 114 of the user 124 or the utility service provider of the utility metering device 106 for subsequent or further investigation.

In one implementation, the determination module 322 may additionally or alternatively determine whether an error between utility fees (or estimated utility billing fees) computed by a receptacle device 104 and the utility metering device 106 exists. The determination module 322 may adopt a similar strategy as described above to determine whether an error between utility fees computed by a receptacle device 104 and the utility metering device 106 exists. For example, the metrology module 212 (or a metrology meter of the metrology module 212) of the receptacle device 104 may have a billing grade accuracy. The determination module 322 may compare or correlate one or more utility fees determined by one or more receptacle devices 104 (or respective one or more virtual receptacle device instances 316) with a utility fee determined by the metrology meter 312 (or the utility metering device 106) at respective one or more time points or time periods. The determination module 322 may then determine whether an error between utility fees computed by a receptacle device 104 and the utility metering device 106 exists based on whether a corresponding degree of correlation is greater than or equal to a predetermined threshold. In an event that an error between the utility fees exists, the determination module 322 may send a synchronization or correction signal to a receptacle device 104 that is in error and update or calibrate a utility rate used by the receptacle device 104 in accordance with a utility rate used by the utility metering device 106 or the metrology meter 312.

In one implementation, the determination module 322 may further communicate with other devices (one or more receptacle devices 104, and/or the client device 108), and exchange (send and receive) scheduling information and/or historical utility delivery information with the other devices. Upon exchanging scheduling and/or historical utility delivery information with the other devices, the determination module 322 may predict or propose one or more time schedules for delivering the utility service to one or more loads 122 from a certain supply outlet 120 that may lower a total utility delivery across a plurality of supply outlets 120 or a total utility consumption across a plurality of loads 122, i.e., load balancing. The determination module 322 may send this information to the client device 108 for display to the user 124 and allow the user 124 to select one or more proposed time schedules for delivering the utility service to the one or more loads 122 associated with the supply outlet 120. In one implementation, upon receiving an instruction (e.g., a user acceptance of one or more proposed time schedules) from the client device 108, the determination module 322 may set up times of utility delivery according to the accepted time schedules, and send these set times to a receptacle device 104 associated with the supply outlet 120 to actuate a delivery of the utility service from the supply outlet 120 to the one or more loads 122 at the scheduled times.

In one implementation, the utility metering device 106 may further include other program data 324 that is configured to store information or data such as one or more instructions received from the client device 108 of the user 124 and/or the utility service provider, TOU information, etc.

Alternative Implementations

The foregoing implementations describe that the utility metering device 106 or the metering application 126 may cooperate with the receptacle device 104 to perform monitoring and/or controlling tasks associated with consumption or delivery of the utility service. In some implementations, the user 124 may use the client device 108 to perform one or more of these monitoring and/or controlling tasks. For example, one or more receptacle devices 104 and the utility metering device 106 may each send the utility consumption data over one or more time periods to the client device 108 (or the metering application 126). The client device 108 (or the metering application 126) may then perform some or all of the monitoring and controlling operations (such as determining whether a mis-calibrated receptacle device 104 or a leakage of the utility service exists, calibrating or synchronizing utility consumption readings between the receptacle device 104 and the utility metering device 106, etc.) of the utility metering device 106 as described in the foregoing implementations.

Additionally or alternatively, the client device 108 or the metering application 126 may cooperate with the utility metering device 106 to perform the monitoring and/or controlling tasks in a distributed and/or a load sharing (or balancing) manner. For example, depending on the capabilities of the utility metering device 106, the client device 108 or the metering application 126 may perform (complicated or intensive) computation operations such as correlation computation, etc., while the utility metering device 106 may send a synchronization signal to one or more corresponding receptacle devices 104 if synchronization is needed.

Furthermore, in some implementations, the client device 108 or the metering application 126 may display utility consumption information to the user 124. For example, the client device 108 or the metering application 126 may receive utility consumption information from one or more receptacle devices 104 and/or the utility metering device 106 over one or more periods of time, and display this information in a textual, tabular and/or graphical manner. Moreover, the client device 108 or the metering application 126 may receive one or more instructions from the user 124 and send the one or more instructions to the receptacle device 104 and/or the utility metering device 106. The one or more instructions may include, for example, an instruction of starting, stopping and/or limiting a delivery of the utility service through a supply outlet 120 associated with a receptacle device 104 to a load 122 within a time period or time duration specified by the user 124. Additionally or alternatively, the one or more instructions may include an instruction or request of verifying an accuracy of utility consumption or delivery information associated with one or more receptacle devices 104, etc.

In one implementation, the client device 108 or the metering application 126 may further communicate with other devices (one or more receptacle devices 104, and/or one or more utility metering devices 106), and exchange (send and receive) scheduling information and/or historical utility delivery information with the other devices. Upon exchanging scheduling and/or historical utility delivery information with the other devices, the client device 108 or the metering application 126 may predict or propose one or more time schedules for delivering the utility service to one or more loads 122 from a certain supply outlet 120 that may lower a total utility delivery across a plurality of supply outlets 120 or a total utility consumption across a plurality of loads 122, i.e., load balancing. The client device 108 or the metering application 126 may display this information to the user 124 and allow the user 124 to select one or more proposed time schedules for delivering the utility service to the one or more loads 122 associated with the supply outlet 120. In one implementation, upon receiving an instruction (e.g., a user acceptance of one or more proposed time schedules) from the user 124, the client device 108 or the metering application 126 may set up times of utility delivery according to the accepted time schedules, and send these set times to a receptacle device 104 associated with the supply outlet 120 to actuate a delivery of the utility service from the supply outlet 120 to the one or more loads 122 at the scheduled times.

Additionally or alternatively, in some implementations, functions performed by one or more receptacle devices 104, one or more utility metering devices 106, and/or one or more client devices 108 may be performed in a distributed manner or in a cloud architecture. For example, some or all of the functions performed by a receptacle device 104, a utility metering device 106 and/or a client device 108 may be performed by one or more services (e.g., the services 114) and/or other receptacle devices 104, utility metering devices 106 and/or client devices 108, etc.

In some implementations, the utility metering device 106 and one or more other utility metering devices (not shown) may anonymously send data (e.g., utility consumption data collected from respective one or more receptacle devices 104 and/or utility consumption data associated with a respective site such as a residential property) to an associated utility service provider (e.g., the central office 112) and/or a third party associated with the utility service provider. In one implementation, the utility service provider or the third party may securely aggregate the data from these utility metering devices, analyze the data and perform load control operations, for example. Additionally or alternatively, these utility metering devices, the utility service provider and/or the third party may anonymously send or report the data to a cloud service (e.g., the services 114) associated with the utility service provider. The cloud service may analyze the data (e.g., determining a total or average amount of utility service consumption over a time period for one or more areas, a spatial distribution of an amount of utility service consumption across different areas, etc.), and anonymously report an analysis result to the utility service provider.

Example Application

An example implementation of the receptacle system 102 is described herein. This example implementation is given for illustrative purpose only and should not be construed as a limitation of the present disclosure. In this example, the utility service is an electricity service. The supply outlet 120 may include an electric vehicle charger, a charging station or a wall power outlet, and the one or more loads 122 may include one or more electric or hybrid vehicles to be charged. In this example, the receptacle device 104 may be adapted to pass an alternating current (AC) or a direct current (DC). In one implementation, the utility service provider may provide information about times of use (TOU) when utility fees or rates are different in different specified time ranges within a particular time period (such as one day, one week, one month, one year, etc.). For example, the utility service provider may indicate that a utility rate for 12:00 am-6:00 am on each day is lower than a utility rate for 6:00 pm-9:00 pm, etc. The utility service provider may provide this information to the utility metering device 106 which may provide this information to the receptacle device 104 and/or the client device 108 (or the metering application 126) of the user 124. Additionally or alternatively, the utility service provider may provide this information directly to the client device 108 (or the metering application 126) of the user 124 through a service (e.g., the service 114) of the utility service provider. The client device 108 (or the metering application 126) may then communicate this information to the receptacle device 104.

In one implementation, the receptacle device 104 may monitor and/or control delivery of the electricity service from the charging station to the one or more electric or hybrid vehicles. For example, the receptacle device 104 (or the monitoring module 218) may examine a time schedule and determine whether the user 124 has set up a time for charging the vehicle (e.g., through the metering application 126 or the display 220 of the receptacle device 104). In response to determining that the user 124 has set up a time for charging the vehicle, the receptacle device 104 may enable a delivery of the electricity service from the charging station to the vehicle at the set time through the switch 226, for example. In one instance, after the receptacle device 104 enables the delivery of the electricity service from the charging station, the receptacle device 104 or the monitoring module 218 may further determine whether the electricity service is consumed after a predetermined period of time (e.g., one minute, five minute, etc.). In an event that no electricity service is consumed, the monitoring module 218 may send a message to the client device 108. In one implementation, the message may include an indication that an input or power plug of the vehicle may not be connected to an output of the charging station. Additionally or alternatively, the message may include a request to the user 124 of the client device 108 to check a connection between the vehicle and the charging station, for example, whether the input plug of the vehicle has been connected to the output of the charging station, etc.

In some implementations, the receptacle device 104 or the monitoring module 218 may automatically schedule or predict a time for charging the vehicle based on the TOU or utility rate information, energy consumption measurements, profiles, etc. Additionally, in one implementation, the receptacle device 104 or the monitoring module 218 may automatically schedule a time for charging the vehicle based further on a time set by the user 124 indicating when the vehicle is to be used, etc. The receptacle device 104 may automatically determine a time that will cost the lowest utility fee for charging the vehicle given that the TOU information and the time set by the user 124, and start the delivery of the electricity service from the charging station to the vehicle at the determined time, etc. Additionally or alternatively, the client device 108 or the metering application 126 may perform this scheduling and send information of a scheduled time to the receptacle device 104 for reference, for example.

In one implementation, the receptacle device 104 may communicate consumption information of the electricity service to the client device 108 and/or the utility metering device 106 continuously or periodically. Furthermore, the receptacle device 104 may receive one or more instructions from the client device 108 and/or the utility metering device 106, and perform one or more actions in accordance with the received instructions.

Exemplary Method

Figure 4:
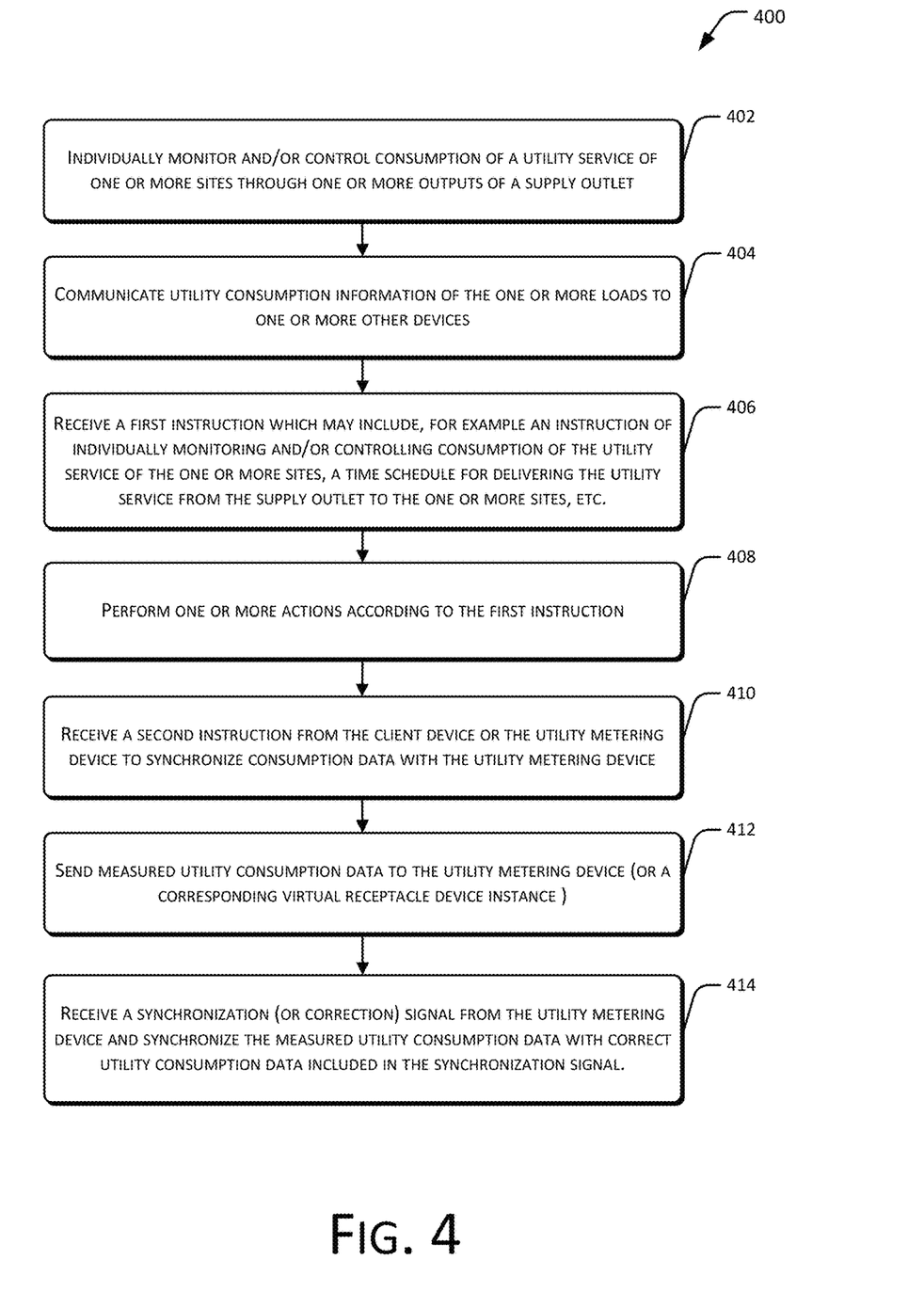
FIG. 4 illustrates the example method of operations performed by a receptacle device, such as the receptacle device of FIG. 2.

FIG. 4 shows an example method 400 of operations performed by a receptacle device 104. The method of FIG. 4 may, but need not, be implemented in the example implementations and environments of FIGS. 1A, 1B, 2 and 3. For ease of explanation, method 400 is described with reference to FIGS. 1A, 1B, 2 and 3. However, the method 400 may alternatively be implemented in other environments and/or using other devices or systems.

Method 400 is described in the general context of computer-executable instructions. Generally, computer-executable instructions can include routines, programs, objects, components, data structures, procedures, modules, functions, and the like that perform particular functions or implement particular abstract data types. The method can also be practiced in a distributed computing environment where functions are performed by remote processing devices that are linked through a communication network. In a distributed computing environment, computer-executable instructions may be located in local and/or remote computer storage media, including memory storage devices.

The exemplary method is illustrated as a collection of blocks in a logical flow graph representing a sequence of operations. The order by which operations within the method are described is not intended to be construed as a limitation, and any number of the described method blocks may be combined in any order to implement the method, or alternate methods. Additionally, individual blocks may be omitted from the method without departing from the spirit and scope of the subject matter described herein.

Referring back to FIG. 4, at block 402, a receptacle device 104 associated with a supply outlet 120 individually monitors and/or controls consumption of a utility service of one or more loads 122 through one or more outputs of the supply outlet 120. In one implementation, the receptacle device 104 may perform one or more monitoring and/or controlling tasks upon request by a user 124 (and/or an associated utility service provider) or automatically on a regular or continued basis.

At block 404, the receptacle 104 may communicate utility consumption information of the one or more loads to one or more other devices. The one or more other devices may include, for example, a utility metering device of a utility service provider, a home area network device and/or a mobile or client device of a user.

At block 406, the receptacle device 104 may receive a first instruction from a client device 108 of the user 124 or a utility metering device 106. The first instruction may include, for example, an instruction of individually monitoring and/or controlling consumption of the utility service of the one or more loads 122, a time schedule for delivering the utility service from the supply outlet 120 to the one or more loads 122, etc.

At block 408, the receptacle device 104 may perform one or more actions in accordance with the first instruction. For example, the receptacle device 104 may individually record an amount of the utility service consumed by each of the one or more loads within a period of time according to the first instruction. Additionally or alternatively, the receptacle device 104 may individually start, stop and/or limit a supply of the utility service to each of the one or more loads in accordance with the first instruction. Additionally or alternatively, the receptacle device 104 may monitor provision of the utility service to a load of the one or more loads within a scheduled time period that is set in the first instruction.

At block 410, the receptacle device 104 may further receive a second instruction from the client device 108 or the utility metering device 106 to synchronize consumption data with the utility metering device.

At block 412, in response to receiving the second instruction, the receptacle device 104 may send measured utility consumption data to the utility metering device 106 (or a corresponding virtual receptacle device instance 316).

At block 414, the receptacle device 104 receives a synchronization (or correction) signal from the utility metering device 106. In one implementation, the synchronization signal may include correct utility consumption data that is determined by the utility metering device. The receptacle device 104 may synchronize its measured utility consumption data with the correct utility consumption data.

CONCLUSION

Although the invention has been described in language specific to structural features and/or methodological acts, it is to be understood that the invention is not necessarily limited to the specific features or acts described. Rather, the specific features and acts are disclosed as exemplary forms of implementing the invention.

What is claimed is:

1. A metering device comprising:
   a metrology unit configured to measure an amount of a utility service provided to a plurality of receptacle devices via the metering device;
   a processor communicatively coupled to the metrology unit; and
   memory communicatively coupled to the processor, the memory storing:
      a plurality of virtual receptacle device instances configured to:
         communicate data with the plurality of receptacle devices; and
         remotely control and monitor consumption of the utility service of a plurality of loads through a plurality of supply outlets that are associated with the plurality of receptacle devices;
         wherein a first virtual receptacle device instance of the plurality of virtual receptacle device instances that is associated with a receptacle device of the plurality of receptacle devices is in communication with the receptacle device and a second virtual receptacle device instance of the plurality of virtual receptacle device instances is also in communication with the receptacle device.

2. The metering device of claim 1, wherein at least one virtual receptacle device instance of the plurality of virtual receptacle device instances is configured to perform an operation different than operations of at least one other virtual receptacle device instance of the plurality of virtual receptacle device instances, the operation of the at least one virtual receptacle device instance comprising at least one of:
   processing of the data for a billing purpose;
   determining whether the data is utility delivery or consumption information associated with the plurality of supply outlets or the plurality of loads; or
   monitoring a quality of the utility service delivered through the plurality of supply outlets or to the plurality of loads.

3. The metering device of claim 1, wherein at least one of the plurality of receptacle devices comprises an adapter to be placed between an output of a supply outlet of the plurality of supply outlets and an input associated with a respective load of the plurality of loads.

4. The metering device of claim 1, wherein remotely controlling the consumption of the utility service of the plurality of loads comprises one or more of individually starting, stopping or limiting a supply of the utility service to individual ones of the plurality of loads.

5. The metering device of claim 1, wherein remotely monitoring the consumption of the utility service of the plurality of loads comprises individually recording an amount of the utility service consumed by individual ones of the plurality of loads within a period of time.

6. The metering device of claim 1, the memory further storing a determination module configured to determine a total amount of utility consumption by the plurality of loads that are associated with the plurality of receptacle devices.

7. The metering device of claim 1, wherein at least one of the plurality of receptacle devices comprises an electric vehicle charger.

8. The metering device of claim 1, wherein the metering device is configured to:
receive an instruction from a mobile device of a user or a home area network device; and
perform an operation according to the instruction.

9. The metering device of claim 1, wherein the plurality of virtual receptacle device instances comprise a first receptacle device instance having a first operating system and a second receptacle device instance having a second operating system, different than the first operating system.

10. The method of claim 1, further comprising sending utility consumption data monitored by the plurality of receptacle devices to a mobile device of a user or to a remote computing device.

11. A metering device comprising:
a metrology unit configured to measure an amount of a utility service provided to a first receptacle device and a second receptacle device via the metering device;
a processor communicatively coupled to the metrology unit; and
memory communicatively coupled to the processor, the memory storing:
a first virtual receptacle device instance having a first operating system and being in communication with the first receptacle device to remotely monitor consumption of the utility service of a first load at the first receptacle device; and
a second virtual receptacle device instance having a second operating system, different than the first operating system, and being in communication with the second receptacle device to remotely monitor consumption of the utility service of a second load at the second receptacle device, wherein the first virtual receptacle device instance is also in communication with the second receptacle device to remotely monitor consumption of the utility service of the second load at the second receptacle device.

12. The metering device of claim 11, wherein the first virtual receptacle device instance is further configured to perform one or more of individually starting, stopping, or limiting a supply of the utility service to the first load; and
the second virtual receptacle device instance is further configured to perform one or more of individually starting, stopping, or limiting a supply of the utility service to the second load.

13. The metering device of claim 11, wherein the first virtual receptacle device instance is configured to perform a first operation on first data communicated with the first receptacle device and the second virtual device instance is configured to perform a second operation on second data communicated with the second receptacle device, different than the first operation, the first and second operations comprising at least one of:
processing of the first or second data for a billing purpose;
determining whether the first or second data is at least one of utility delivery or consumption information associated with the first load or utility delivery or consumption information associated with the second load; or
monitoring a quality of the utility service delivered through at least one of the first load or the second load.

14. The metering device of claim 11, wherein the metering device is configured to:
receive an instruction from a mobile device of a user or a home area network device; and
perform an operation according to the instruction.

15. The metering device of claim 11, wherein at least one of the first receptacle device comprises an electric vehicle charger or the second receptacle device comprises an electric vehicle charger.

16. A method performed by a metrology unit configured to measure an amount of a utility service provided to a plurality of receptacle devices via a metering device, the method comprising:
storing, in a memory of the metering device, a plurality of virtual receptacle device instances configured to:
communicate, by a first virtual receptacle device instance of the plurality of virtual receptacle device instances, data with a first receptacle device of the plurality of receptacle devices;
perform, by the first virtual receptacle device instance, operations on the data communicated by the first receptacle device;
communicate, by a second virtual receptacle device instance of the plurality of virtual receptacle device instances, data with the receptacle device of the plurality of receptacle devices; and
perform, by the second virtual receptacle device instance, operations on the data communicated by the receptacle device, wherein the operations performed by the first virtual receptacle device instance are different than the operations performed by the second virtual receptacle device instance.

17. The method of claim 16, wherein the operations comprise at least one of:
processing of the data for a billing purpose;
determining whether the data is utility delivery or consumption information associated with a plurality of supply outlets or a plurality of loads; or
monitoring a quality of the utility service delivered through a plurality of supply outlets or to a plurality of loads.

18. The method of claim 16, wherein the plurality of virtual receptacle device instances are further configured to remotely control and monitor consumption of the utility service of a plurality of loads through a plurality of supply outlets that are associated with the plurality of receptacle devices.

19. The method of claim 16, wherein the method further comprises identifying a receptacle device of the plurality of receptacle devices that is in error by obtaining respective degrees of correlation for the plurality of receptacle devices.

20. The method of claim 16, wherein at least one of the plurality of receptacle device instances comprises an independent operating system.

\* \* \* \* \*